Dec. 8, 1942.  E. K. JOHANSEN  2,304,363
CRANE SCALE
Filed Nov. 1, 1940  2 Sheets-Sheet 2
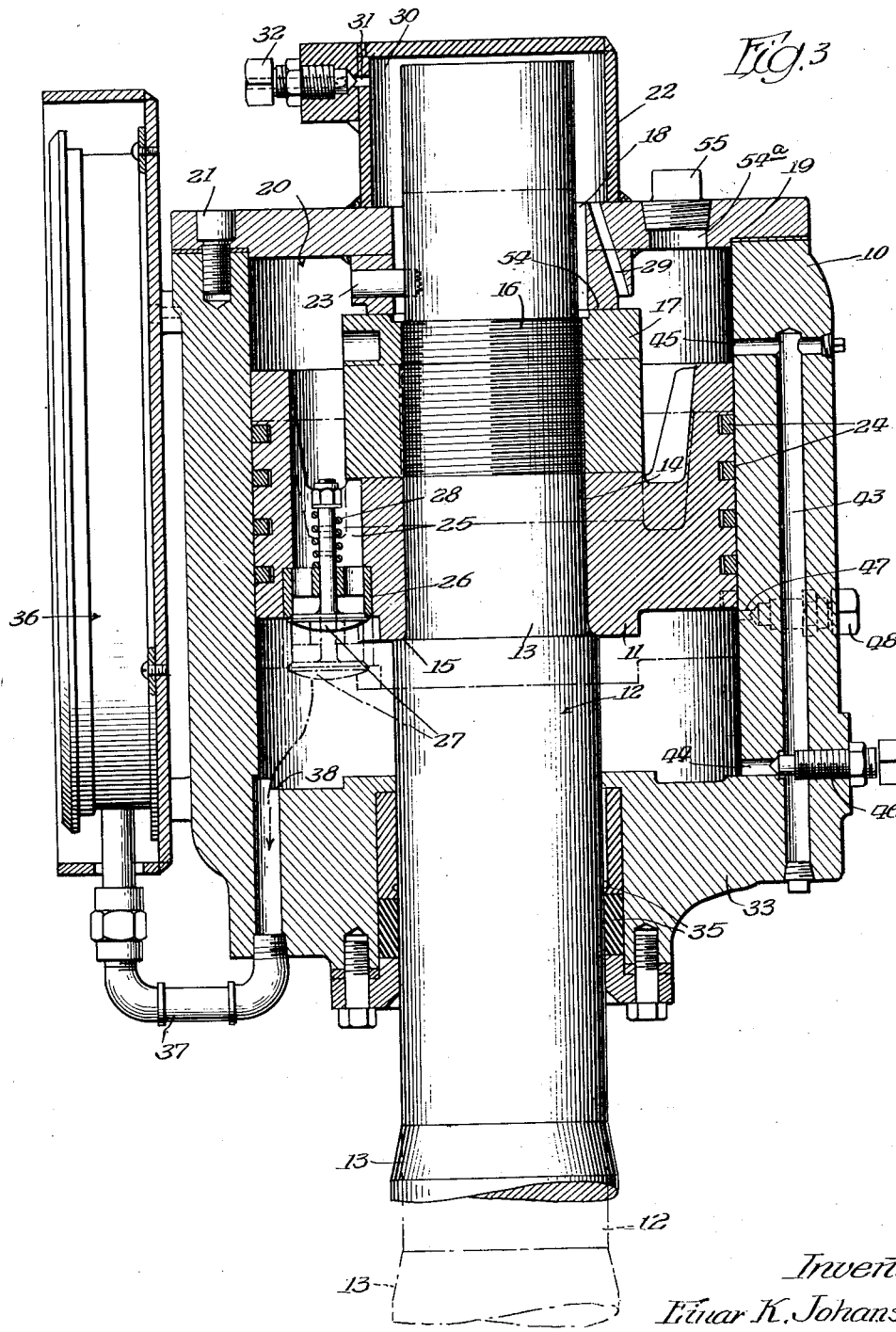
Fig. 3
Inventor
Einar K. Johansen
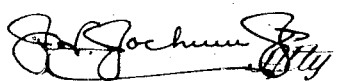

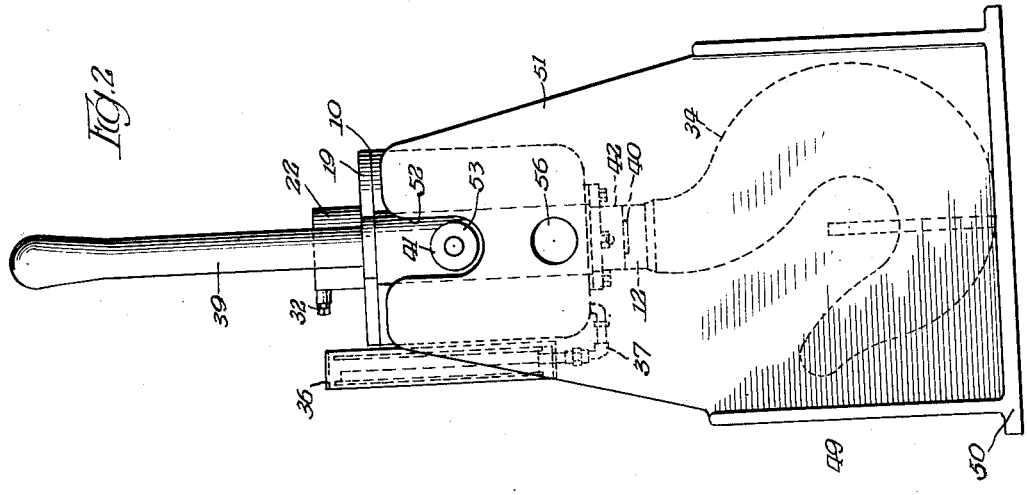
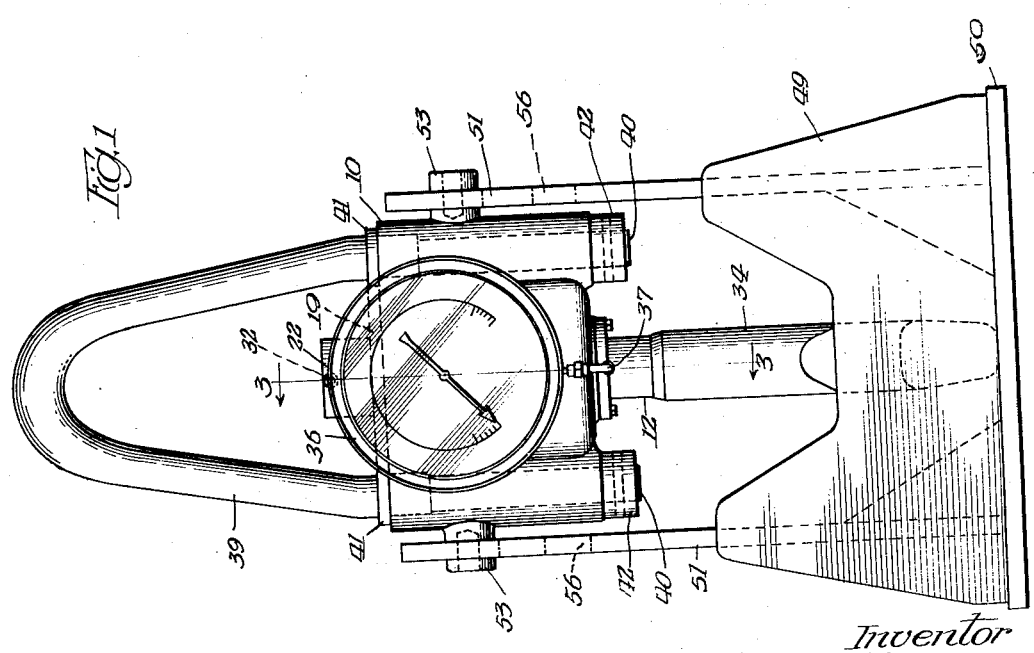

Patented Dec. 8, 1942

2,304,363

UNITED STATES PATENT OFFICE 2,304,363

CRANE SCALE

Einar K. Johansen, Chicago, Ill., assignor to Clearing Machine Corporation, Clearing, Ill., a corporation of Illinois Application November 1, 1940, Serial No. 363,799

1 Claim. (Cl. 265—47)

This invention relates to improvements in crane scales of the hydraulic or fluid pressure type, and one of the objects of the same is to provide an improved scale of this character which will be of a compact arrangement and which will be capable of handling articles of large tonnage, and at the same time will itself be easily handled and transported.

A further object is to provide an improved scale of this character in which levers and beams will be dispensed with, and in which the number of movable parts will be reduced to a minimum.

A further object is to provide an improved holder or support for the scale when it is not in use, and which support will be of a construction that when the scale is placed thereupon the parts of the scale will assume positions as to cause the fluid to flow from one side to the other side of one of the movable elements, to insure that when the scale is lifted from the support and used, fluid pressure created by the relative movement of said element with respect to another and cooperating element, will operate an indicator or gauge.

A further object is to provide in a scale of this character a cylinder and a piston element movable one with relation to the other to create a pressure upon a fluid or liquid intermediate the piston and cylinder, and improved means whereby a flow or circulation of fluid from one side to the other side of the piston element will be produced, whereby to permit such relative movement, and improved means whereby the speed of such circulation or flow of the fluid may be varied or controlled.

To the attainment of these ends and the accomplishment of other new and useful objects as will appear, the invention consists in the features of novelty in substantially the combination and arrangement of the several parts hereinafter more fully described and claimed and shown in the accompanying drawings illustrating this invention, and in which Figure 1 is a front elevation of a scale of this character constructed in accordance with the principles of this invention showing the same placed within a support or holder, when not in use.

Figure 2 is a right hand end elevation of Figure 1.

Figure 3 is a detail vertical sectional view, on an enlarged scale, taken on line 3—3 Figure 1.

In the present exemplification of this invention the scale consists essentially of a cylinder member 10 and a piston 11 reciprocable therein.

The piston 11 is connected to a piston rod 12 in any suitable manner but preferably by means of a reduced portion 13 of the piston rod passing through an opening 14 in the piston, the reduced portion 13 forming a shoulder 15 against which the piston 11 rests. The reduced portion 13 may be provided with threads 16 upon which there is threaded a nut or collar 17. The collar 17 co-operates with the shoulder 15 of the piston rod to clamp the piston therebetween and the extremity of the piston rod passes through an opening 18 in the end 19 of the cylinder chamber 20. This end 19 may be secured in position in any suitable manner, such as by means of fastening bolts 21.

A cap member 22 may be provided to form a closure for the opening 18 and this cap member is in the nature of a hood into which the extremity of the piston rod 12 may project.

In order to prevent th piston rod and the piston from axially rotating in the cylinder, there may be provided a pin or lug 23 secured to a fixed portion of the cylinder and projecting into a longitudinal slot in the piston rod.

The piston may be provided with packing rings 24 and is also provided with a passage 25 therethrough which passage is provided with a valve seat 26 controlled by a valve 27 and this valve in turn is adapted to be held upon its seat by means of a suitable spring 28. The passage 25 is provided for the purpose of forming communication between the portion of the cylinder on one side of the piston with the portion of the cylinder on the other side thereof so as to permit fluid to flow from the upper side of the piston to the lower side thereof when the fluid is moving in one direction, and the valve 27 will prevent the fluid from flowing back to the first side of the piston when the movement is in the opposite direction.

A passageway 29 is provided in the end of the cylinder which communicates with the space within the cap 22 so as to permit the escape of air, and leading from the space 30 is an air outlet 31 controlled by a valve 32 which permits the escape of the air to the atmosphere.

The piston rod extends through the other end 33 of the cylinder for any desired or suitable distance and connected to this end of the piston rod is a work supporting or holding member 34 here shown in the form of a hook. Suitable packing 35 is provided for the portion of the piston which passes through the end 33 of the cylinder.

The numeral 36 designates a fluid pressure operated gauge for indicating the weight of the article being weighed. This gauge 36 may be of any desired or suitable construction and is adapted to be operated by pressure exerted upon the fluid in the cylinder by the relative movement of the cylinder and piston elements, fluid pressure being communicated to the gauge 36 in any suitable manner, preferably through a pipe 37 one end of which communicates with the gauge 36 and the other end of which has communication with the interior of the cylinder 20 through a passage 38.

Connected to the cylinder member 10 is a suitable yoke 39 the ends 40 of which pass through the cylinder member 10 and each of the arms of the yoke is provided with a shoulder 41 which rests upon the end of the cylinder member 10. Nuts or collars 42 are threaded upon the free extremities of the arms of the yoke and serve to secure the yoke to the cylinder member 10.

In use the scale is lifted by means of the yoke 39 and when lifted there will be a relative movement between the cylinder member 10 and the piston 11, piston rod 12 and work supporting member 34, and as the valve 27 will be closed, the piston 11 will create a pressure upon the fluid therebelow when the load is lifted and this pressure will be communicated to the gauge 36 through the pipe 37.

In order, however, to permit a relative movement of the cylinder 10 and the piston 11, there is provided a passage 43 in the wall of the cylinder member 10 and this passage has communication, as at 44, with the cylinder on one side of the piston 11 and as at 45, with the cylinder on the other side of the piston so that when the cylinder member 10 is held suspended and the work is supported by the hook 34, the tendency of the piston 11 will be to move downwardly, and as it moves downwardly a portion of the fluid therebelow will be forced through the outlet 44 through the passage 43 and out of the outlet 45 on the other side of the piston, causing a displacement of the fluid.

The rate of flow of volume of fluid that passes through the passage 43 may be controlled in any desired or suitable manner, such as by means of a valve 46 which is adapted to be set at the will of the operator. By allowing the fluid to pass through such a valve-controlled passage from one side to the other side of the piston while the piston is in motion, a more accurate reading of the instrument may be obtained.

An air escape opening 47 may also be provided and this escape opening is controlled by a valve or element 48.

When the scale is not in use it is adapted to be placed into a holder or upon a support designated generally by the reference numeral 49 which may be of any desired construction, but is preferably provided with a base 50 having spaced uprights 51 projecting thereabove. Each of the uprights is provided with a recess 52 opening through the top thereof and carried by the cylinder member 10 are laterally projecting lugs 53 which, when the scale is placed within the support, will enter the recesses 52 or bifurcations at the upper ends of the uprights 51.

The recesses 52 as well as the uprights 51 are of such a size and construction that when the scale is not in use and is placed in the support, the bottom of the hook or work supporting element 34 will engage and rest against the bottom 50 of the support, and the lugs 53 will project into the recesses 52. Owing to the weight of the cylinder and its supporting mechanism when the lower end of the element 34 engages the bottom 50 of the support, the piston rod 12 and the piston 11 will be held stationary and when the suspension means which engages the yoke 39 is released or slackened, the cylinder member 10 will gravitate and this gravitating movement will be arrested by the engagement of a shoulder element 54 with the collar 17 on the piston rod. Such gravitating movement will be permitted by reason of the fact that the fluid on the top side of the piston will be forced to the bottom side of the piston, by the end 19 of the cylinder, by means of the passage 25 through the piston 11, the spring 28 of the valve 27 yielding under pressure created upon the fluid so as to permit the fluid to pass therethrough.

During this movement of the cylinder member 10 with respect to the piston 11, should any of the fluid flow back through the passage 43, this will not be objectionable as under such conditions it is only necessary that the fluid be transferred from the top to the bottom side of the piston.

When it is again desired to use the scale, it is lifted by a suspension member engaging the yoke 39. The scale will then be lifted from the support. The first operation, however, will be to cause the cylinder 10 to move upwardly with respect to the piston 11, sufficient fluid beneath the piston being forced through the passage 43 to permit of such relative movement. A further raising of the cylinder 10 by the yoke 39 will then cause the piston 11 and the work supporting member 34 to be elevated and the parts will then be in position for operation.

The cylinder is provided with a fill opening 54ª closed by a closure 55, and in order to readily transport the support 49, there may be provided one or more openings 56 in the uprights 51 into which any suitable lifting or transporting means may engage.

The work is then attached to the hook shaped member 34 and the relative movement of the cylinder and piston elements under such stress will cause pressure to be exerted upon the fluid beneath the piston to actuate the indicator or gauge 36.

While the preferred form of the invention has been herein shown and described, it is to be understood that various changes may be made in the details of construction and in the combination and arrangement of the several parts, within the scope of the claim, without departing from the spirit of this invention.

What is claimed as new is:

A crane scale embodying closed cylinder and piston elements movable one with relation to the other, a piston rod connected with the piston and extending beyond one end of the cylinder, means whereby a suspension device may be connected to one of said elements, pendent work supporting means connected to the other of said elements, a liquid pressure transmitting medium completely filling said cylinder on both sides of the piston, a pressure indicating gauge having free communication with the cylinder on one side of the piston, there being a liquid passage directly through the piston from one side to the other side thereof and within the cylinder, a single valve controlling said passage, said valve operating automatically under predetermined conditions to permit passage of the liquid from one side to the other side of the piston, and an additional valve-controlled passage also within the confines of the periphery of the cylinder and communicating at its ends with the cylinder and leading around the piston.

EINAR K. JOHANSEN.